United States Patent
McArdle et al.

(10) Patent No.: US 8,686,105 B2
(45) Date of Patent: *Apr. 1, 2014

(54) ADHESIVE SYSTEMS USING IMINES AND SALTS THEREOF, PRECURSORS TO ELECTRON DEFICIENT OLEFINS AND COREACTANTS THEREFOR

(75) Inventors: Ciaran B. McArdle, Dublin (IE); Ligang Zhao, Goettingen (DE)

(73) Assignee: Henkel IP & Holding GmbH, Duesseldorf (DE)

( * ) Notice: Subject to any disclaimer, the term of this patent is extended or adjusted under 35 U.S.C. 154(b) by 1297 days.

This patent is subject to a terminal disclaimer.

(21) Appl. No.: 11/877,712

(22) Filed: Oct. 24, 2007

(65) Prior Publication Data

US 2014/0018487 A1    Jan. 16, 2014

(51) Int. Cl.
   *C09J 163/00* (2006.01)
(52) U.S. Cl.
   USPC ........ 528/229; 528/393; 558/462; 558/303; 564/278; 564/271
(58) Field of Classification Search
   USPC ........................ 528/269, 229, 393
   See application file for complete search history.

(56) References Cited

U.S. PATENT DOCUMENTS

| | | | |
|---|---|---|---|
| 2,582,128 A | 1/1952 | Hurwitz | |
| 2,870,193 A | 1/1959 | Pollack et al. | |
| 3,048,615 A * | 8/1962 | Fields | 560/35 |
| 3,142,698 A * | 7/1964 | Halpern et al. | 558/442 |
| 3,282,773 A | 11/1966 | Wicker | |
| 3,554,987 A | 1/1971 | Smith | |
| 3,995,641 A | 12/1976 | Kronenthal et al. | |
| 4,056,543 A | 11/1977 | Ponticello | |
| 4,160,864 A | 7/1979 | Ponticello | |
| 4,202,920 A | 5/1980 | Renner et al. | |
| 4,440,910 A | 4/1984 | O'Connor | |
| 4,560,723 A | 12/1985 | Millet | |
| 4,764,545 A | 8/1988 | Yosida | |
| 4,876,045 A | 10/1989 | Longo et al. | |
| 5,340,873 A | 8/1994 | Mitry | |
| 5,386,047 A | 1/1995 | Nakos et al. | |
| 5,994,464 A | 11/1999 | Ohsawa | |
| 6,096,848 A | 8/2000 | Gololobov et al. | |
| 6,174,919 B1 | 1/2001 | Hickey | |
| 6,531,460 B1 | 3/2003 | Takenouchi et al. | |
| 6,833,196 B1 | 12/2004 | Wojciak | |
| 2004/0013614 A1 * | 1/2004 | Martinez et al. | 424/46 |
| 2006/0094833 A1 | 5/2006 | McDonnell et al. | |
| 2006/0269870 A1 | 11/2006 | Harada et al. | |
| 2008/0241249 A1 | 10/2008 | Quintero et al. | |

FOREIGN PATENT DOCUMENTS

| | | |
|---|---|---|
| DE | 2 626 173 | 12/1977 |
| DE | 40 34 080 A1 | 6/1991 |
| DE | 19519958 | 12/1995 |
| EP | 0 127 855 | 12/1984 |
| EP | 0 267 981 A | 5/1988 |
| WO | WO 94/15907 | 7/1994 |

OTHER PUBLICATIONS

International Search Report for International Patent Application No. PCT/EP2008/064489 dated Dec. 30, 2008.

(Continued)

*Primary Examiner* — Randy Gulakowski
*Assistant Examiner* — Rachel Kahn
(74) *Attorney, Agent, or Firm* — Steven C. Bauman (57) ABSTRACT

This invention relates to adhesive systems using imines and salts thereof, precursors to electron deficient olefins and coreactants therefor.

16 Claims, 4 Drawing Sheets

(56) References Cited

OTHER PUBLICATIONS

International Search Report for International Patent Application No. PCT/EP2008/064490 dated May 4, 2009.
International Search Report for International Patent Application No. PCT/EP2008/064488 dated Jul. 16, 2009.
H.C. Haas, et al., "Carbamylmethyl Esthers of Unsaturated Acids"; Journal of Polymer Science; vol. XXXVII, Issue 131; pp. 317-319; 1959, (XP002518680).
J.L. De Keyser et al., "A versatile and convenient multigram synthesis of methylidenamalonic acid diesters", J. Org. Chem., pp. 4859-48562, (1988) (XP002518681).
D.A. Aronovich, et al.; J. Appl. Chem. USSR.; vol. 52, pp. 900-902; 1979 (XP002518682).
P.H. Mason, et al., "A New Route to Substituted Glutaric Acid Derivatives From Allylic Malonates"Synthetic Communications; vol. 25(2); pp. 183-190; 1995.
T. Sato, et al. "Synthesis Of Copper (II) Chelate Of ethyl a-(acetoacetoxymethyl)acrylate And Its Radical-Initiated Polymerization"; Markomol. Chem., Rapid Commun. vol. 11; pp. 553-557; 1990.
M.L. Meketa, et al., "An Efficacious Method For The Halogenation Of .beta.-dicatonyl Compunds Under Mildly Acidic Conditions"; Tetrahedron Letter; vol. 46(28); pp. 4749-4751; 2005, XP002520970.
M.L. Meketa, et al., "An Efficacious Method For The Halogenation Of .beta.-dicarbonyl Compounds Under Mildly Acidic Conditions"; Tetrahedron Letter; vol 46(28); pp. 4749-4751; 2005, XP003630971
*Applicant believes document XP002520970 is same document as XP002520971—only one copy is submitted.
R.C. Cookson, et al., "2-Phenylthioallyl Alcohols And Their Use IN The Synthesisi of 1,4-diketones And Cyclopentenones"; Journal Of Chemical Society, Chemical Communications; (23); p. 990; 1976, XP002520969.
P.H. Mason, et al., "Some Mechanistic And Synthetic Aspects Of the DABCO Catalyzed Rearrangement Of Allylic Esters"; Tetrahedron; vol 50(41);pp. 12001-12008, XP002520967.
Samatha, et al., "Effect of Addition of Various Acrylates on the Performance of Ethyl Cyanoacrylate Adhesive", Polm.-Plast. Technol. Eng., 39(2), 381-92, (2000).
Vijayalakshmi, et al., "Synthesis and End Use Evaluation of Pinene-based Alicyclic Acrylates", *J. Polym. Mat.*, 13, pp. 127-131 (1996).
Yamada, et al., "Determination of Absolute Rate Constants for Radical Polymerization and Copolymerization of Eythl a-Cyanoacrylate in the Presence of Effective Inhibitors against Anionic Polymerization", Makromol. Chem. 184, 1025 (1983).
Vijayalaskshmi, et al., "Synthesis of 3-Substituted-2-cyanocrylates: Their Evaluation as Cross-link in Cyanoacrylate Adhesive Compositions", *J. Polym. Mat.*, 49, 1387 (1993).
Ponticello, "The Preparation of a-Substitiuted Acrylic Esters", *J. Poym. Sci., Polym. Chem. Edn.*, 17, pp. 3509-18 (1979).
Pines, Alul and Kolobieski, "Bromination of a-Methylstyrene with N-Bromosuccinimide, Sythesis of 2-Phenyl-1,5-hexadiene", *J. Org. Chem.*, 22, 1113 (1957).

\* cited by examiner

ADHESIVE SYSTEMS USING IMINES AND SALTS THEREOF, PRECURSORS TO ELECTRON DEFICIENT OLEFINS AND COREACTANTS THEREFOR

BACKGROUND OF THE INVENTION

1. Field of the Invention

This invention relates to adhesive systems using imines and salts thereof, precursors to electron deficient olefins and coreactants therefor.

2. Brief Description of Related Technology

Cyanoacrylate adhesives are known for their fast adhesion and ability to bond a wide variety of substrates. They are marketed as "super glue" type adhesives. They are useful as an all-purpose adhesive since they are a single component adhesive, very economical as only a small amount will do, and generally do not require any equipment to effectuate curing.

Traditionally, cyanoacrylate monomers have been produced by way of a Knoevenagel condensation reaction between a formaldehyde precursor, such as paraformaldehyde, and an alkyl cyanoacetate with a basic catalyst. During the reaction, cyanoacrylate monomer forms and polymerises in situ to a prepolymer. The prepolymer is subsequently thermally cracked or depolymerised, yielding cyanoacrylate monomer. This approach has remained essentially the same over time, though various improvements and variants have been introduced. See e.g. U.S. Pat. Nos. 6,245,933, 5,624,699, 4,364,876, 2,721,858, 2,763,677 and 2,756,251.

In U.S. Pat. No. 3,142,698, the synthesis of difunctional cyanoacrylates using a Knoevenagel condensation reaction is described. However, the ability to thermally depolymerise the resulting, now crosslinked, prepolymer in a reliable and reproducible manner to produce pure difunctional monomers in high yields is questionable [see J. Buck, *J. Polym. Sci., Polym. Chem. Ed.*, 16, 2475-2507 (1978), and U.S. Pat. Nos. 3,975,422, 3,903,055, 4,003,942, 4,012,402, and 4,013,703].

A variety of other processes for producing cyanoacrylate monomers are known, some of which are described below. For instance, U.S. Pat. No. 5,703,267 defines a process for producing a 2-cyanoacrylic acid which comprises subjecting a 2-cyanoacrylate and an organic acid to a transesterification reaction.

U.S. Pat. No. 5,455,369 defines an improvement in a process for preparing methyl cyanoacrylate, in which methyl cyanoacetate is reacted with formaldehyde to form a polymer that is then depolymerized to the monomeric product, and in which the purity of yield is 96% or better. The improvement of the '369 patent is reported to be conducting the process in a poly(ethylene glycol) diacetate, dipropionate, or dibutyrate, having a number average molecular weight of 200-400, as the solvent.

U.S. Pat. No. 6,096,848 defines a process for the production of a biscyanoacrylate, which comprises the steps of esterifying a 2-cyanoacrylic acid or transesterifying an alkyl ester thereof to obtain a reaction mixture; and fractionally crystallizing the reaction mixture to obtain the biscyanoacrylate.

U.S. Pat. No. 4,587,059 defines a process for the preparation of monomeric 2-cyanoacrylates comprising the steps of (a) reacting (i) a 2,4-dicyanoglutarate with (ii) formaldehyde, cyclic or linear polymers of formaldehyde, or a mixture thereof, in the presence of between about 0.5 and about 5 mols of water per mol of 2,4-dicyanoglutarate, at an acid pH of about 3 to slightly less than 7, and at a temperature of about 70 to about 140, to form an oligomeric intermediate product, and (b) removing water that is present from step (a) and thermolyzing the oligomeric intermediate product for a period of time sufficient to effect its conversion to monomeric 2-cyanoacrylates.

Commercial production of cyanoacrylate monomers ordinarily relies on the depolymerisation of a prepolymer formed under Knoevenagel condensation reaction conditions, as noted above. Still today the Knoevenagel condensation reaction is believed to remain the most efficient and prevalent commercial method for producing high yields of monofunctional cyanoacrylates. Nevertheless, it would be desirable to not have to resort to thermally induced depolymerisation of a prepolymer produced by the Knoevenagel condensation reaction. This prospect may also enable facile access to highly useful difunctional monomers, such as so-called bis-cyanoacrylates or hybrid materials of cyanoacrylate and other polymerisable or reactive functionality.

Moreover, being able to generate mono cyanoacrylate or multifunctional cyanoacrylate or related monomers for instance in an in situ manner without resort to Knoevenagel condensation reaction conditions would be quite beneficial because it would enable a system that provides essentially a "cyanoacrylate or related monomers on demand". If the precursors to such mono or multifunctional cyanoacrylate monomers in such a system could be formulated with additional components ordinarily being incompatible with cyanoacrylates and such like, a considerable advance in instant adhesive technology could be realized. And it would be quite advantageous if such a system could provide a physical property profile not otherwise attainable from conventional cyanoacrylate formulations alone. Such a system has remained absent from the published literature, until now.

SUMMARY OF THE INVENTION

Unlike the state of the technology, the present invention provides a method by which electron deficient olefins, such as cyanoacrylate monomers, may be generated in situ and used in adhesive systems.

In one aspect of the invention, the method is conveniently employed in an adhesive system, where three components are provided and after mixing, an adhesive, containing the electron deficient monomer, is generated and a cured reaction product is formed.

More specifically, in the adhesive system, a first component comprising an imine, a second component comprising a compound containing at least one methylene linkage having at least one electron withdrawing substituent attached thereto, and a third component comprising a compound bearing a functional group reactive with a product formed from mixing the first component with the second component are provided.

The electron withdrawing substituents contained on the compound of the second component may be selected from nitrile, carboxylic acids, carboxylic esters, sulphonic acids, ketones or nitro, and where two electron withdrawing substituents are present on the methylene linkage and when they are a nitrile and a carboxylic ester, a cyanoacrylate is formed after dispensing and mixing.

The reactive functional group borne on the third component may be selected from epoxides, episulfides, oxetanes, isocyanates, (meth)acrylates, maleimides, benzoxazines, or oxazolines, and combinations thereof.

The imine is embraced within structure I as follows:

where K is where $R_1$-$R_2$ are each independently selected from hydrogen, alkenyl, or alkynyl; and A-B are each independently selected from linear, branched, or cyclic alkyl or alkenyl which may be interrupted with heteroatoms or substituted by functional groups, or A and B taken together form a cyclic or polycyclic alkyl or alkenyl structure, which may be interrupted with heteroatoms or substituted by functional groups;

E is selected from a linear, branched or cyclic hydrocarbon with or without one or more nitrogen-containing substituents thereon, a heterocyclic, an aromatic or an organosiloxane group or part thereof or linkage; and $R_3$ is selected from a hydrocarbon, a heterocyclic, an aromatic or an organosiloxane group or linkage;

w is 1-100; y is 1-100 and z is 0-100.

When more than one of K, E or $R_3$ are present, each instance thereof is defined independently from the other instance(s).

The imine more specifically is embraced within structure IA as follows:

where $R_1$-$R_2$, A-B, E, $R_3$, w, y and z are as defined above.

In another aspect of the invention, an adhesive system is provided which comprises:

(a) an iminium salt within structure II:

where $K^+$ is where $R_1$-$R_2$ are each independently selected from hydrogen, alkenyl, or alkynyl; and A-B are each independently selected from linear, branched, or cyclic alkyl or alkenyl which may be interrupted with heteroatoms or substituted by functional groups, or A and B taken together form a cyclic or polycyclic alkyl or alkenyl structure, which may be interrupted with heteroatoms or substituted by functional groups;

E is selected from a linear, branched or cyclic hydrocarbon with or without one or more nitrogen-containing substituents thereon, a heterocyclic, an aromatic or an organosiloxane group or part thereof or linkage; and $R_3$ is selected from a hydrocarbon, a heterocyclic, an aromatic or an organosiloxane group or linkage;

w is 1-100; y is 1-100 and z is 0-100; and

X is an anion;

(b) a compound containing at least one methylene linkage having at least one electron withdrawing substituent attached thereto, where the electron withdrawing substituent is selected from nitrile, carboxylic acids, carboxylic esters, sulphonic acids, ketones or nitro; and

(c) a compound bearing at least one functional group reactive with either:

the compound containing at least one methylene linkage having at least one electron withdrawing substituent attached thereto from (b) or a product of the reaction of the iminium salt from (a) with the compound containing at least one methylene linkage having at least one electron withdrawing substituent attached thereto from (b).

When more than one of K, E or $R_3$ are present, each instance thereof is defined independently from the other instance(s).

More specifically, the iminium salt of structure II embraces iminium salts within structure IIA:

where $R_1$-$R_2$, A-B, E, $R_3$, w, y, z and X are as defined above.

The imine in some cases may be an imine having an onium salt, such as an ammonium or amine salt functionality. In some cases the imines may be termed an "ionic liquid" (or "IL") or a task specific ionic liquid (or, "TSIL"), as will be discussed in more detail below.

In such cases where the imine of structure I or the iminium salt of structure II is particularly stable at room temperature conditions when in the presence of the precursor to the electron deficient olefin, a modest amount of heat may be useful to allow the reaction to generate electron deficient olefins, prior to cure thereof. Exposure to elevated temperature conditions is particularly desirable with iminium salts of structure II.

In other cases the imine or iminium salt may be tethered to a support, as is explained in more detail below. The support may be part of the packaging in which the components of the adhesive system are contained. Or, the support may be part of an additive, such as a filler or a fiber, used in the adhesive system.

The compound with which the imine or iminium salt reacts to form an electron deficient olefin is a precursor thereto and contains at least one methylene linkage having at least one electron withdrawing substituent attached thereto, where the electron withdrawing substituent is selected from nitrile, carboxylic acids, carboxylic esters, sulphonic acids, ketones or nitro.

In one aspect, the inventive process for the preparation of a reactive adhesive system, includes the following steps:

(a) providing as one component an imine within structure I;

(b) providing as a second component a compound containing at least one methylene linkage having at least one electron withdrawing substituent attached thereto, where the electron withdrawing substituent is selected from nitrile, carboxylic acids, carboxylic esters, sulphonic acids, ketones or nitro; and (c) providing as a third component a compound bearing at least one functional group reactive with a product of mixing the first component with the second component.

The present invention also provides a process for preparing a cured reaction product of such a reactive adhesive system, steps of which include (i) providing a reactive adhesive system formed by the process set forth above; and (ii) mixing either a. the first component and the second component under appropriate conditions and for a time sufficient to yield an adhesive composition comprising a reactive electron deficient olefin and thereafter reacting the compound of (c) under appropriate conditions and for a time sufficient to yield a cured reaction product of the adhesive system; or b. the first component, the second component and the compound of (c) under appropriate conditions and for a time sufficient to yield a cured reaction product of the adhesive system.

In another aspect, the inventive process for the preparation of a reactive adhesive system, includes the following steps:

(a) providing in a first part an iminium salt within structure II, and a compound containing at least one methylene linkage having at least one electron withdrawing substituent attached thereto, where the electron withdrawing substituent is selected from nitrile, carboxylic acids, carboxylic esters, sulphonic acids, ketones or nitro; and a compound bearing at least one functional group reactive with a product of reacting the iminium salt with the compound containing at least one methylene linkage having at least one electron withdrawing substituent attached thereto.

The present invention also provides a process for preparing a cured reaction product of such a reactive adhesive system, steps of which include (i) providing a reactive adhesive system formed by the process set forth above; and (ii) exposing the reactive adhesive system to elevated temperature conditions and for a time sufficient to yield a cured reaction product of the adhesive system.

In these processes, an imine or iminium salt is used as a reactant to yield the electron deficient olefin. The imine may have an onium, such as an ammonium or amine salt functionality, as noted above. Alternatively, or additionally, as noted above and discussed in more detail below the imine or iminium salt may be tethered to a support.

In any of these aspects, the adhesive systems may include added catalyst (such as an imine as set forth in structure III) or a modest amount of heat (such as noted above).

DETAILED DESCRIPTION OF THE INVENTION

As noted above, the present invention provides an adhesive system, in which

A. a first part comprises an imine within structure I:

where K is where $R_1$-$R_2$ are each independently selected from hydrogen, alkenyl, or alkynyl; and A-B are each independently selected from linear, branched, or cyclic alkyl or alkenyl which may be interrupted with heteroatoms or substituted by functional groups, or A and B taken together form a cyclic or polycyclic alkyl or alkenyl structure, which may be interrupted with heteroatoms or substituted by functional groups;

E is selected from linear, branched or cyclic hydrocarbon with or without one or more nitrogen-containing substituents thereon, a heterocyclic, an aromatic or an organosiloxane group or part thereof or linkage; and $R_3$ is selected from a hydrocarbon, a heterocyclic, an aromatic or an organosiloxane group or linkage; and w is 1-100; y is 1-100 and z is 0-100;

B. a second part comprises a compound containing a methylene linkage having at least one electron withdrawing substituent attached thereto, where the electron withdrawing substituent is selected from nitrile, carboxylic acids, carboxylic esters, sulphonic acids, ketones or nitro; and a further compound bearing at least one functional group reactive with a product formed from mixing the first part with the second part.

When more than one of K, E or $R_3$ are present, each instance thereof is defined independently from the other instance(s).

The imine more specifically is embraced within structure IA as follows:

where $R_1$-$R_2$, A-B, E, $R_3$, w, y and z are as defined above.

Desirably, in structure I w is 2, y is 1 and z is 1.

Desirably, in structure I $R_3$ comprises a N-containing linkage or group, a P-containing linkage or group, or a S-containing linkage or group. Alternatively, in structure I $R_3$ comprises a polymer structure such as a polyorganosiloxane linkage or group.

More specifically, in structure I $R_3$ may include aliphatic hydrocarbons with chain lengths of $C_2$-$C_{12}$, linear or branched, or aliphatic cyclic hydrocarbons such as may be derived from cyclohexane, cyclohexene, norbornenes or fused ring systems, polyethylene oxide segments, aromatic hydrocarbons, such as bisphenol A and bisphenol F, polymeric and copolymeric backbones derived from (meth)acrylates, styrene, acrylonitrile, acrylamides, polyisobutylenes, polymers or copolymers bearing pendent moieties capable of further polymerization, such as pendant (meth)acrylates, epoxides, isocyanates, vinyls, acetylenes, and inorganic polymers including polysiloxanes and derivitised polysiloxanes including those with pendant polymerisable groups.

The adhesive system may also include in the first component an imine within structure III

III where $R_4$-$R_5$ are each independently selected from hydrogen, alkenyl, or alkynyl; and $R_6$ is a hydrocarbon moiety comprising a tertiary carbon which is attached to the N atom, where the tertiary carbon atom is attached to or forms part of one or more substituents selected from linear, branched, or cyclic alkyl or alkenyl groups, or one or more taken together form a cyclic or polycyclic (as the case may be) alkyl or alkenyl structure, which itself (themselves) may have substituents attached thereto. The addition of an imine within structure III to the first component of the adhesive system may assist in increasing the speed of the reaction between the first component and the second component when they are mixed together, such as when they are dispensed from separate containers or separate chambers within the same container.

In the adhesive systems, the compound (or precursor to the electron deficient olefin) contains a methylene linkage, desirably at least two methylene linkages, each of which having at least two electron withdrawing substituent attached thereto.

In the adhesive systems, a compound bearing at least one functional group reactive with the product formed upon mixing the first component or part and the second component or part is included.

The compound bearing functionality reactive with the product formed from mixing the first component or part and the second component or part may be selected from epoxy-containing compounds, episulfide-containing compounds, oxetane-containing compounds, benzoxazine-containing compounds, maleimide-containing compounds, oxazoline-containing compounds, isocyanate-containing compounds, (meth)acrylate-containing compounds, compounds containing one or more of such functional groups or combinations thereof.

The product formed from mixing the first component or part and the second component or part and the compound bearing at least one functional group reactive therewith may be present in the adhesive system in substantially a 1:1 ratio.

Alternatively, instead of an imine within structure I, an iminium salt within structure II as follows:

II where $K^-$ is where $R_1$-$R_2$ are each independently selected from hydrogen, alkenyl, or alkynyl; and A-B are each independently selected from linear, branched, or cyclic alkyl or alkenyl which may be interrupted with heteroatoms or substituted by functional groups, or A and B taken together form a cyclic or polycyclic alkyl or alkenyl structure, which may be interrupted with heteroatoms or substituted by functional groups;

E is selected from a linear, branched or cyclic hydrocarbon with or without one or more nitrogen-containing substituents thereon, a heterocyclic, an aromatic or an organosiloxane group or part thereof or linkage; and $R_3$ is selected from a hydrocarbon, a heterocyclic, an aromatic or an organosiloxane group or linkage;

w is 1-100; y is 1-100 and z is 0-100; and

X is an anion, may be mixed with the second component of the previously described adhesive system to form a one part system.

More specifically, the iminium salt within structure II may embrace the iminium salt within structure IIA:

IIA where $R_1$-$R_2$, A-B, E, $R_3$, w, y, z and X are as defined above.

The iminium salt within structure IIA may be in the form of an IL having a melting point less than 100° C., which in its molten form contains only ions. The IL is also not distillable at a pressure of 1 mBar and a temperature of 100° C. The IL is in the liquid state at a temperature in the range of −10° C. to +250° C., such as in the range of 15° C. to +250° C., desirably in the range of 50° C. to +150° C.

In another aspect, the present invention provides a process for the preparation of a reactive adhesive composition. This process includes the steps of:

(a) providing in one part an imine within structure I;

(b) providing in a second part a compound containing at least one methylene linkage having at least one electron withdrawing substituent attached thereto, where the electron withdrawing substituent is selected from nitrile, carboxylic acids, carboxylic esters, sulphonic acids, ketones or nitro, and a further compound bearing at least one functional group reactive with a product formed from mixing the first part with the second part; and (c) mixing the first part and the second part under appropriate conditions and for a time sufficient to yield an adhesive composition comprising a reactive electron deficient olefin.

In an alternative to that aspect, the present invention provides (a) an iminium salt within structure II, and (b) a compound containing at least one methylene linkage having at least one electron withdrawing substituent attached thereto, where the electron withdrawing substituent is selected from the group consisting of nitrile, carboxylic acids, carboxylic esters, sulphonic acids, ketones or nitro; and (c) a compound bearing at least one functional group reactive with either:

the compound containing at least one methylene linkage having at least one electron withdrawing substituent attached thereto from (b) or a product of the reaction of the iminium salt from (a) with the compound containing at least one methylene linkage having at least one electron withdrawing substituent attached thereto from (b).

In these processes, desirably the compound containing at least one methylene linkage having at least one electron withdrawing substituent attached thereto comprises at least one ester of cyanoacetic acid or a half ester derived from malonic acid. These acids once esterified may contain moieties such as aliphatic hydrocarbons with chain lengths of $C_2$-$C_{12}$, linear or branched, or aliphatic cyclic hydrocarbons such as derived from cyclohexane, cyclohexene, norbornenes or fused ring systems, polyethylene oxide segments, aromatic hydrocarbons such as bisphenol A and bisphenol F, polymeric and copolymeric backbones derived from (meth)acrylates, styrene, acrylonitriles, acrylamides, polyisobutylenes, or polymers or copolymers bearing pendant moieties capable of further polymerization, such as pendant (meth)acrylates, epoxides, isocyanates, vinyls, acetylenes, and inorganic polymers including polysiloxanes and derivitised polysiloxanes including those with pendant polymerisable groups.

Figure 4:
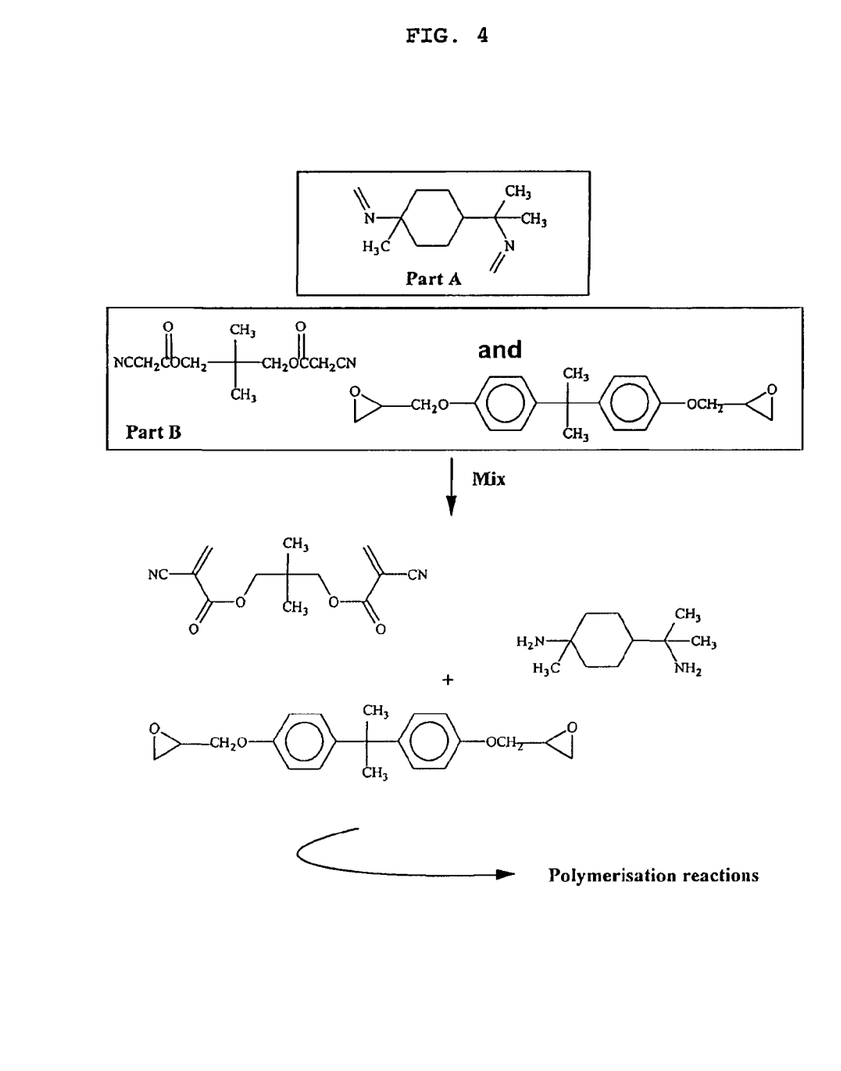
FIG. 4 depicts a schematic of a two part adhesive system comprising Part A an imine or iminium salt (the latter not being shown), and Part B comprising a precursor to an electron deficient olefin admixed with a further component (bisepoxide shown in this example). Each of the two parts may be contained separately in individual barrels of a dual syringe. After expression and mixing (with or without added catalyst or heat), the reactive adhesive is formed. In the case where an iminium salt is used in place of an imine, the parts may be contained in a single barrel syringe and no reaction will take place until appropriate conditions, such as exposure to elevated temperature, are applied.

In this regard the electron withdrawing substituents of the compound containing at least one methylene linkage having at least one electron withdrawing substituent attached thereto may be as defined for $R_3$ in the imine or iminium salt compounds described generally in structures I and II. However, different combinations will also be possible here. For example, structure I may contain an $R_3$ based on a bisphenol A system and this may be used in combination with a methylene compound bearing at least one electron withdrawing substituent derived from siloxane segments. Desirably, the methylenic compound bears two electron withdrawing groups and may be monofunctional, difunctional or polyfunctional with respect to such methylenic groups. By reference to FIG. 4, the methylene compound is the biscyanoacetate of neopentyl glycol, a branched aliphatic hydrocarbon.

In additional aspects, the present invention provides novel compositions of matter, including those embraced within structures I and II.

For the imine shown below in structure IA, $R_1$-$R_{12}$ are each independently selected from hydrogen, alkenyl, or alkynyl;

A-B are each independently selected from linear, branched, or cyclic alkyl or alkenyl which may be interrupted with heteroatoms or substituted by functional groups, or A and B taken together form a cyclic or polycyclic alkyl or alkenyl structure, which may be interrupted with heteroatoms or substituted by functional groups;

E is selected from a linear, branched or cyclic hydrocarbon with or without one or more nitrogen-containing substituents thereon, a heterocyclic, an aromatic or an organosiloxane group or part thereof or linkage; and $R_3$ is selected from a hydrocarbon, a heterocyclic, an aromatic or an organosiloxane group or linkage; and w is 1-100; y is 1-100 and z is 0 or 100.

Desirably, w is equal to 2, y equal to 1 and z equal to 1.

$R_3$ in structure I may also be substituted with polymerisable functionality, such as for instance by a vinyl group, a (meth)acrylate group, a styryl group or an epoxide group.

$R_3$ in structure I may also be attached to a support that may be a solid support or a liquid support. Examples of solid supports include silica, aluminum oxide, zeolites, or glass, whereas examples of liquid supports include a liquid polymer having one or more functional groups. For instance, $R_3$ may be linked to or be part of a support material through a linker formed as an O, ester, reverse ester, S, thioester, reverse thioester, amide, reverse amide, urea, urethane, or reverse urethane.

And for the iminium salt shown below in structure IIA:

$R_1$-$R_2$ are each independently selected from hydrogen, alkenyl, or alkynyl;

A-B are each independently selected from linear, branched, or cyclic alkyl or alkenyl which may be interrupted with heteroatoms or substituted by functional groups, or A and B taken together form a cyclic or polycyclic alkyl or alkenyl structure, which may be interrupted with heteroatoms or substituted by functional groups;

E is selected from a linear, branched or cyclic hydrocarbon with or without one or more nitrogen-containing substituents thereon, a heterocyclic, an aromatic or an organosiloxane group or part thereof or linkage; and $R_3$ is selected from a hydrocarbon, a heterocyclic, an aromatic or an organosiloxane group or linkage; w is 1-100; y is 1-100 and z is 0-100; and X is an anion.

Desirably, w is equal to 2, y equal to 1 and z equal to 1.

The iminium salt of structure IIA desirably is in the form of an ionic liquid.

And as with structure IA, $R_3$ may be substituted with polymerisable functionality, such as for instance a vinyl group, a (meth)acrylate group, a styryl group or an epoxide group.

Likewise $R_3$ in structure IIA may also be attached to a support, such as described above in connection with structure IA.

And X in structure II is an anion selected from anions, such as $PF_6$, $BF_4$, $AsF_6$, $SbF_6$, $Tf_2N$, $(CN)_2N$, triflate, camphorsulfonate, benzenesulfonate, dodecylbenzene sulfonate, saccharinate, acesulfamate, $MF_6$, where M is Nb or Ta, nitrate, $CF_3CO_2$, halide, phosphate, perchlorate or $CH_3SO_3$, the latter of which may be the same or different to the anion counterbalancing charge for the organic cation. See also Davis et al., in *Ionic Liquids in Synthesis*, P. Wasscherheid and T. Welton, eds., Wiley-VCH Verlag GmbH & Co. KGaA, Chapter 2 (2002). (See e.g. International Patent Publication No. WO 03/086605 A2.)

In addition, the anion may also be selected from peroxomonosulfate ($HSO_5^-$), 0.5 persulfate ($S_2O_8^{2-}$), or 0.5 peroxidiphosphate ($H_2P_2O_8^{2-}$), the latter of which being a known initiator for redox polymerization [Sarac, *Prog. Polym. Sci.*, 24, 1149 (1999)]. Reference to the figures may be useful to appreciate the chemical reactions that are marshaled to carry out further the present invention, which is described in more detail below and in the Examples section that follows below.

Figure 1:
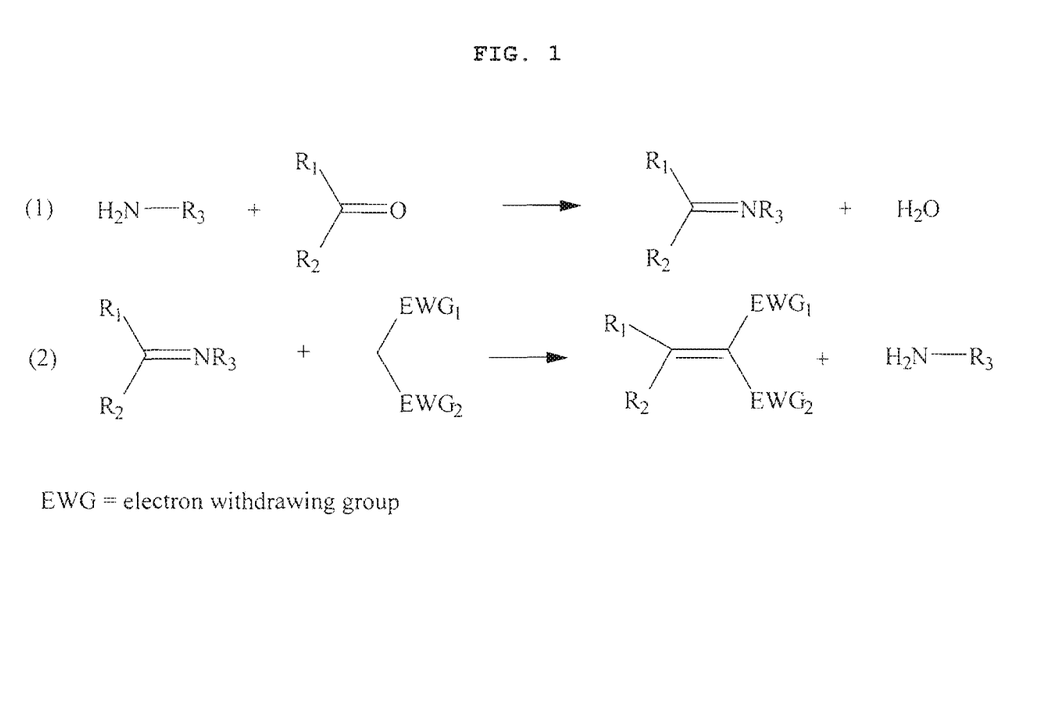
FIG. 1 depicts a general scheme by which electron deficient olefins may be prepared from a t-alkyl imine (shown in the second step), which itself is prepared in the preceding step.
Figure 2:
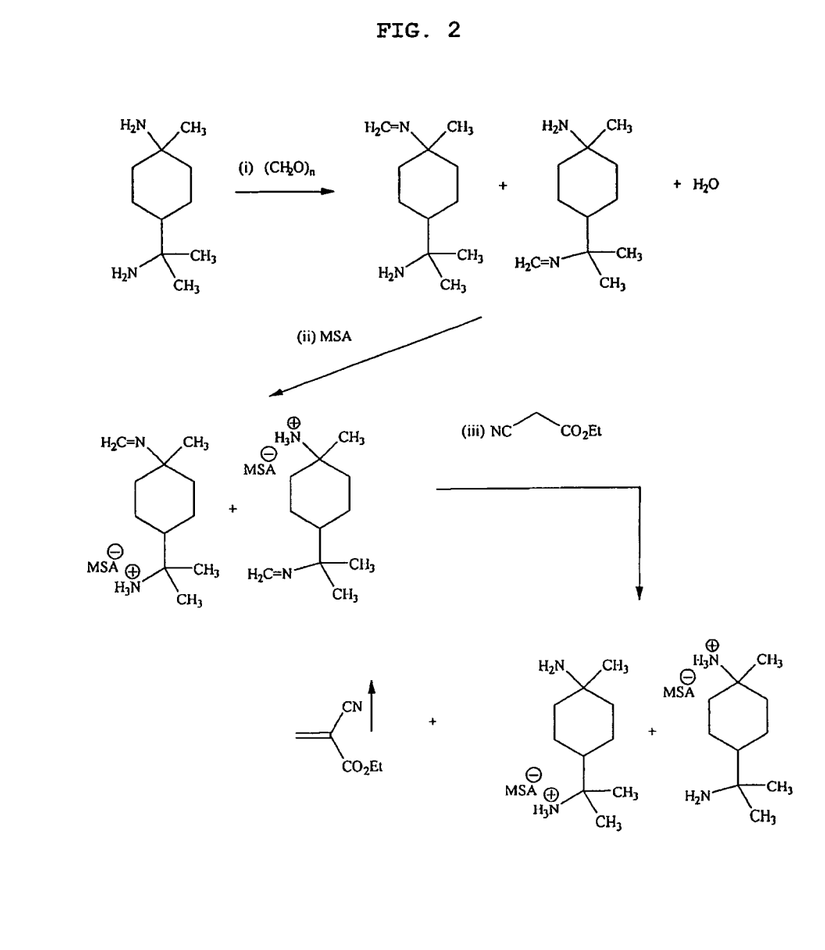
FIGS. 2 and 3 depict synthetic schemes by which 2-cyanoacrylate esters may be prepared from t-alkyl imines [having ammonium (FIG. 2) or imidazolium (FIG. 3) salt functionality as well], according to the present invention.
Figure 3:
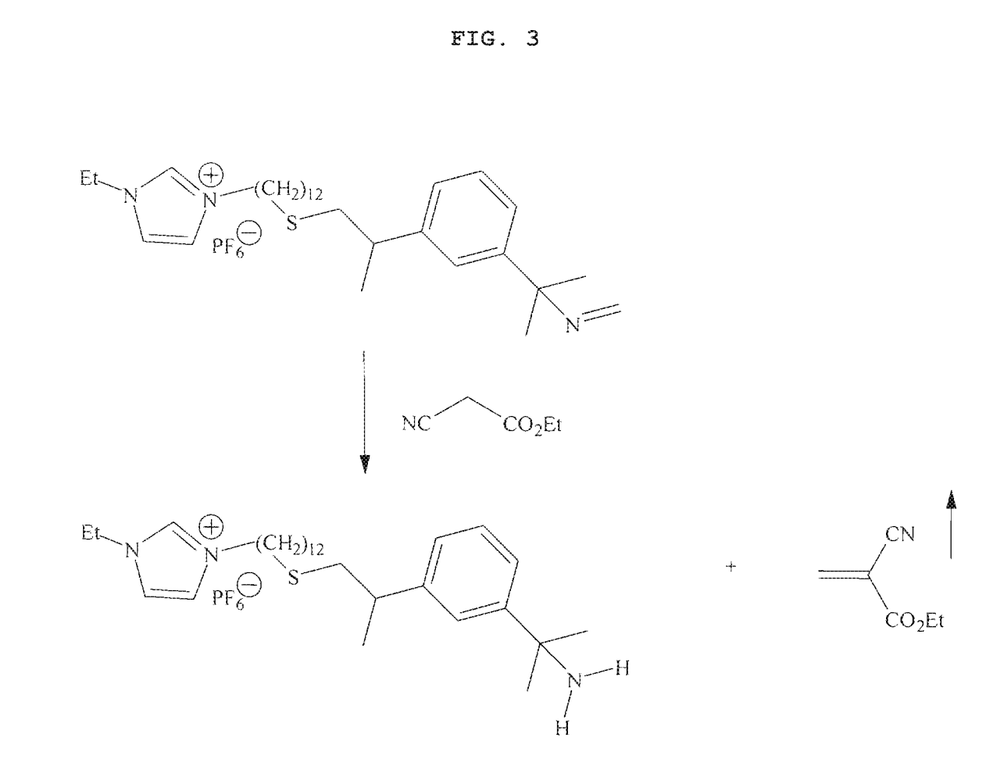

Thus, with reference to FIG. 1, as an initial reactant, is an aldehyde compound having the structure $R_1R_2C=O$, where $R_1$ is hydrogen and $R_2$ is a hydrogen, vinyl or propargyl. The aldehyde compound may be an aldehyde itself or a source of an aldehyde, such as one that yields an aldehyde like formaldehyde under appropriate reaction conditions. The aldehyde compound in a desirable embodiment includes formaldehyde (or a source thereof, such as paraformaldehyde, formalin, or 1,3,5-trioxane) or vinyl aldehydes, such as acrolein. In FIG. 2, paraformaldehyde is shown as $(CH_2O)_n$ where n>1.

As a reactant with such an aldehyde is a primary amine. Primary amines attached to a carbon bearing no alpha protons are particularly desirable, such as t-alkyl primary amines. Rohm and Haas Co., Philadelphia, Pa. has sold commercially for a number of years a series of t-alkyl primary amines, which are designated as PRIMENE-brand amines.

For instance, t-alkyl primary amines available from Rohm and Haas include PRIMENE 81-R and PRIMENE JM-T. These PRIMENE-brand t-alkyl primary amines have highly branched alkyl chains in which the amino nitrogen atom is attached directly to a tertiary carbon. These t-alkyl primary amines consist of mixtures of isomeric amines, with PRIMENE 81-R consisting of an isomeric mixture with $C_{12}$-$C_{14}$ carbon branches and having an average molecular weight of 185 and PRIMENE JM-T consisting of an isomeric mixture with $C_{16}$-$C_{22}$ carbon branches and having average molecular weight of 269.

PRIMENE MD, also known as menthanediamine (1,8-diamino-p-menthane) or (4-amino-α,α-4-trimethyl-cyclohexanemethanamine, CAS No. 80-52-4), is a primary alicyclic diamine, in which both amino groups are attached to tertiary carbon atoms. Like other t-alkyl primary amines, menthanediamine is somewhat less reactive than similar straight chain diamines. Yet another PRIMENE, PRIMENE TOA has tertiary octyl chains and a molecular weight of 129.

In FIG. 1 equation (2) if $EWG_1$ nitrile and $EWG_2$ is acetate, for instance, cyanoacrylic ester is formed with a primary amine as a byproduct. When the primary amine byproduct is volatile (e.g., t-butyl amine), volatile electron deficient olefinic monomer (e.g., ethyl-2-cyanoacrylate) which forms during the exothermic reaction and under the conditions employed (e.g., addition of heat and vacuum) is incompletely removed from the reaction mixture, for example by vacuum distillation, before the primary amine byproduct initiates polymerization of the monomer.

However, if the initial imine used in the reaction is itself designed to be substantially non-volatile under the conditions employed so that the byproduct primary amine derived therefrom and after reaction with an active methylene compound, such as a cyanoacetate, the volatile electron deficient olefinic monomer may be separated from the reaction mixture without subsequent initiation by the primary amine byproduct. In this situation, for instance, the optional separation step of the inventive processes may be performed.

Versions of hybrid imine-ammonium salts derived from PRIMENE MD (structure IV below) after condensation with paraformaldehyde are shown below in structures V(a) and V(b). Such hybrid imine-ammonium salts possess a structure, in which there exists an imine nitrogen attached to a tertiary carbon, and a quaternary ammonium salt in the same molecular,

IV

V(a)

V(b)

In the case of imines bearing an amine functionality as well, the amine functionality may be converted into ammonium salts by contacting them with an acidic species, such as trifluoroacetic acid, acetic acid, sulfuric acid, methane sulfonic acid, benzene sulfonic acid, dodecylbenzene sulfonic acid and camphor sulfonic acid [see e.g. J. March at 802, and references cited therein; see also M. B. Smith, Organic Synthesis, McGraw Hill International, Chemistry Series, 1302 (1994) and references cited therein and Abbaspour Tehrani and De Kimpe, Science of Synthesis, 27, 313 (2004), and references cited therein]. When there is more than one basic functionality in the same molecule further mixtures may result, for example, in the above case, iminium salts may also form.

Examples of such imines within structure I are shown below in structures VI-VIII.

VI

-continued

VII

VIII

C1

C2

C3

Phosphonium-containing ionic liquids are described for example in International Patent Publication No. WO 0187900.

Such imines may be derived from appropriate primary amines attached to tertiary carbons (i.e., a carbon having no protons directly attached thereto). Examples of such amine or amine precursors are shown below.

Brough et al., *Chem. Eur. J.*, 12, 5134 (2006) describe the preparation of 2,4-diamino-2,4-dimethylpentane (A) as an intermediate in the synthesis of pyrimidinyl nitronyl nitroxides.

A

Trumbo et al., *J. Appl. Polym. Sci.*, 82, 1030 (2001) describe the synthesis of amine containing monomer (B) from the corresponding commercially available isocyanates, commonly known as m-TMI (and available commercially from Cytec Industries Inc.)

B

Following the procedure of Trumbo et al., the siloxane series shown in structures (C1-C3) described by Zhou et al., *J. Polym. Sci.; Part A Polym. Chem. Ed.*, 29, 1097 (1991) may be prepared with primary amines attached directly onto tertiary carbons attached indirectly to siloxanes and polysiloxanes.

Examples of aminoalkyloxysiloxanes in which a primary amine is attached to a tertiary carbon are described by Mehrotra et al., *J. Organometalic Chem.*, 24, 611 (1970) and are illustrated in structure D, where q is 0, 1 or 2 when h is 4, or 2, respectively.

D

Hydrocarbon systems bearing primary amines attached to tertiary carbons have been described for instance by Son et al., *J. Org Chem.*, 46, 323 (1981), an example of which is illustrated below in structure E

E

Q in structure E is shown below in structures E1 and E2 with t equal to 2, 3, or 6 and the substituted aromatic system with meta or para substitution patterns.

E2

E3

Morpholinone-derived molecules have been described in International Patent Publication No. WO 9914206 A1, an example of which is shown below as structure F.

F

Bifunctional primary amines on tertiary carbons have been described by Semkus, *J. Amer. Chem. Soc.*, 69, 1380 (1947) and U.S. Pat. Nos. 2,415,046, 2,413,249, 2,413,250, and 2,363,464, representative examples of which are shown below in structures G and H.

G

H

Imines of the appropriate structure may be prepared by transforming the abovementioned amine systems by reaction with a source of formaldehyde to yield imines embraced by structure I. And of course iminium salts embraced by structure II may be prepared by contacting the imine with an appropriate acid as set forth herein.

The imines, whether or not bearing ammonium salt functionality or whether or not they are tethered to a support, are then reacted with compounds containing a methylene linkage having at least one, desirably two, electron withdrawing substituent attached thereto. In these compounds, the electron withdrawing substituent is selected from nitrile, carboxylic acids, carboxylic esters, sulphonic acids, ketones or nitro.

In a desirable embodiment, these compounds have two or more electron withdrawing substituents, which may be the same or different, such as nitrile and carboxylic acid ester in this case, a cyanoacrylate. Of course, the reactivity of these compounds in large part depends on the degree of electron withdrawing capability, and the number, of the substituents on the active methylene carbon. Representative examples of these compounds include malonic acid and its esters, cyanoacetic acid and its esters. A particularly desirable example is the ethyl ester of cyanoacetic acid.

Structure IX below illustrate the electron deficient olefinic products that would result from a reaction with imine, using the above reactants.

IX

Here, when a source of formaldehyde is used, n is 0 in structure IX and a methylenic compound results with X and Y being nitrile, carboxylic acid, or carboxylic acid esters; X being nitro and Y being carboxylic acid ester; or X being nitrile and Y being carboxylic acid ester, the latter combination giving rise to 2-cyanoacrylates using alkyl cyanoacetates as a substrate, for example. When acrolein is used, n is 1 and the same combinations of X and Y can apply in structure IX.

The electron deficient olefin so formed may be a variety of olefins having at least one electron withdrawing group attached thereto. In a desirable embodiment, as noted above with respect to the second reactant, the electron deficient olefin so formed will have two or more electron withdrawing groups attached thereto, which may be the same or different. Particularly desirable products have two electron withdrawing groups attached thereto that are different, such as 2-cyanoacrylate esters.

Representative examples of 2-cyanoacrylate esters so formed by the inventive processes include methyl, ethyl, n-propyl, i-propyl, propargyl, n-butyl, i-butyl, n-pentyl, n-hexyl, 2-ethylhexyl, n-octyl, n-nonyl, oxononyl, n-decyl, n-dodecyl, allyl, ethynyl, 2-butenyl, cyclohexyl, phenyl, phenethyl, tetrahydrofurfuryl, chloroethyl, 2,2,2-trifluoroethyl, hexafluoroisopropyl, methoxymethyl, methoxyethyl, methoxybutyl, ethoxyethyl, propoxyethyl, butoxymethyl, butoxyethyl or dimethyl siloxane esters of 2-cyanoacrylic acid.

The electron deficient olefin may also be a compound having one end terminating with a cyanoacrylate, cyanopentadienoate, or alkylene derived from dimalonate or malononitrile and another end terminating with a group selected from branched and unbranched alkyl esters, esters containing aromatics and heterocyclic nuclei, acrylates, cyanoacrylates, siloxanes, blocked and unblocked isocyanates, anhydrides, silanes, vinyls, or acetylenes.

The reaction may proceed with or without heating or cooling, depending of course on the specific reactants and the scale of the reaction. Decomposition of the source of formaldehyde, e.g., paraformaldehyde, may occur under gentle heating up to a temperature of 70° C., to liberate formaldehyde in situ in the reaction medium. The temperature may be reached through an external heating element or internally by means of the exotherm that may be generated, depending of course on the identity of the reactants. The temperature of the reaction should be controlled however to accommodate any such exothermic processes.

Stabilizers may be included in one or both parts of the inventive adhesive system to tailor the reactivity of the two parts of the system, as may be desired. Suitable stabilizers include free radical stabilizers and acidic stabilizers.

For example, free radical stabilizers include hydroquinone, pyrocatechol, resorcinol or derivatives thereof, such as hydroquinone monoethyl ether, or phenols, such as di-t-butylphenol or 2,6-di-t-butyl-p-cresol, 2,2'-methylene-bis-(4-methyl-6-t-butylphenol), bisphenol A, dihydroxydiphenylmethane, and styrenized phenols.

For example, acidic stabilizers include sulfuric acid, hydrochloric acid, sulfonic acids, such as methane, ethane or higher sulfonic acids, p-toluene sulfonic acid, phosphoric acid or polyphosphoric acids, silyl esters of strong acids, such as trialkyl chlorosilanes, dialkyl dichlorosilanes, alkyl trichlorosilanes, tetrachlorosilane, trialkyl silylsulfonic acids, trialkyl silyl-p-toluene sulfonates, bis-trialkyl silylsulfate and trialkyl silylphosphoric acid esters.

The amount of either stabilizer used to stabilize the electron deficient olefin prepared by the inventive processes is well known to those of ordinary skill in the art, and may be varied depending on the properties of the resulting composition made from the so formed electron deficient olefin.

The following examples are intended to illustrate but in no way limit the present invention.

EXAMPLES

Example 1

To a stirring mixture of bisphenol-A epoxy resin (23 g) and ethyl cyanoacetate (20 mmol, 2.26 g) at a temperature of about 60° C., was added freshly distilled n-methyldidene-tert-butylamine (monomer and trimer mixture) (1.70 g). The reaction mixture was allowed to continue stirring for a period of time of 30 minutes. After that time, the reaction mixture was cooled to room temperature, and a hard brown polymer was observed to have formed.

Example 2

To a stirring mixture of bisphenol A epoxy resin (21 g) and ethyl cyanoacetate (20 mmol, 2.26 g) at room temperature was added PRIMENE MD diimine (10 mmol, 1.94 g). The reaction mixture was allowed to continue stirring and an elevated temperature of 150° C. was introduced to the reaction by way of an oil bath for a period of time of 30 minutes. After this time period, the reaction mixture was cooled to room temperature, and a hard brown polymer was observed to have formed.

Example 3

To a stirring mixture of bisphenol A epoxy resin (25 g) and ethylene biscyanoacetate (10 mmol, 1.96 g) at room temperature was added PRIMENE MD diimine (10 mmol, 1.94 g). The reaction mixture was allowed to continue stirring and an elevated temperature of 150° C. was introduced to the reaction by way of an oil bath for a period of time of 30 minutes. After this time period, the reaction mixture was cooled to room temperature, and a hard brown polymer was observed to have formed.

Example 4

To cyanoacetic acid 2-isocyanatoethyl ester (20 mmol, 3.08 g) was added with stirring at room temperature freshly distilled n-methyldidene-tert-butylamine (63-64° C., 1.70 g). The reaction mixture quickly reached a temperature of 120° C. after several seconds. A yellow solid polymer was then observed to have formed.

Example 5

Example 4 was repeated by placing onto a glass microscope slide a single drop of each of cyanoacetic acid 2-isocyanatoethyl ester and n-methyldidene-tert-butylamine. A second glass microscope slide was placed over the mixture and an instant, adhesive was observed to have formed between the slides with a very strong bond.

Example 6

Example 4 was repeated by placing onto a mild steel substrate a single drop of each of cyanoacetic acid 2-isocyanatoethyl ester and n-methyldidene-tert-butylamine. A second mild steel substrate was placed over the mixture and an instant adhesive was observed to have formed between the slides with a very strong bond.

What is claimed is:
1. An adhesive system comprising
A. a reactive electron deficient olefin formed by mixing:
(a) a first part comprising an imine within structure I:

wherein K is wherein $R_1$-$R_2$ are each independently selected from the group consisting of hydrogen, alkenyl, and alkynyl; and A-B are each independently selected from the group consisting of linear, branched, or cyclic alkyl or alkenyl which may be interrupted with heteroatoms or substituted by functional groups, or A and B taken together form a cyclic or polycyclic alkyl or alkenyl structure, which may be interrupted with heteroatoms or substituted by functional groups;
E is selected from the group consisting of a linear, branched and cyclic hydrocarbon with or without one or more nitrogen-containing substituents thereon, a heterocyclic, an aromatic or an organosiloxane group or part thereof or linkage; and
$R_3$ is selected from the group consisting of a hydrocarbon, a heterocyclic, an aromatic and an organosiloxane group or linkage;
w is 1-100; y is 1-100 and z is 0-100, wherein when more than one of K, E or $R_3$ are present, each instance thereof is defined independently from the other instance(s); and
(b) a second part comprising a compound containing a methylene linkage having at least one electron withdrawing substituent attached thereto, wherein the electron withdrawing substituent is selected from the group consisting of nitrile, carboxylic acids, carboxylic esters, sulphonic acids, ketones and nitro;
B. a compound bearing at least one functional group reactive with the electron deficient olefin product formed from mixing the first part with the second part;
C. an imine within structure III wherein $R_4$-$R_5$ are each independently selected from the group consisting of hydrogen, alkenyl, and alkynyl; and $R_6$ is a hydrocarbon moiety comprising a tertiary carbon which is attached to the N atom, wherein the tertiary carbon atom is attached to or forms part of one or more substituents selected from linear, branched, or cyclic alkyl or alkenyl groups, or one or more taken together form a cyclic or polycyclic (as the case may be) alkyl or alkenyl structure, which itself(themselves) may have substituents attached thereto.

2. An adhesive system comprising:
(a) an iminium salt within structure II:

wherein $K^+$ is wherein $R_1$-$R_2$ are each independently selected from the group consisting of hydrogen, alkenyl, and alkynyl; and A-B are each independently selected from the group consisting of linear, branched, or cyclic alkyl or alkenyl which may be interrupted with heteroatoms or substituted by functional groups, or A and B taken together form a cyclic or polycyclic alkyl or alkenyl structure, which may be interrupted with heteroatoms or substituted by functional groups;

E is selected from the group consisting of a linear, branched or cyclic hydrocarbon with or without one or more nitrogen-containing substituents thereon, a heterocyclic, an aromatic and an organosiloxane group or part thereof or linkage; and $R_3$ is selected from the group consisting of a hydrocarbon, a heterocyclic, an aromatic or an organosiloxane group or linkage; wherein when more than one of K, E or $R_3$ are present, each instance thereof is defined independently from the other instance(s);

w is 1-100; y is 1-100 and z is 0-100; and
X is an anion;

(b) a compound containing at least one saturated methylene linkage having at least one electron withdrawing substituent attached thereto, wherein the electron withdrawing substituent is selected from the group consisting of nitrile, carboxylic acids, carboxylic esters, sulphonic acids, ketones and nitro; and (c) a compound bearing at least one functional group reactive with either:
the compound containing at least one methylene linkage having at least one electron withdrawing substituent attached thereto from (b) or
a product of the reaction of the iminium salt from (a) with the compound containing at least one methylene linkage having at least one electron withdrawing substituent attached thereto from (b).

3. The adhesive system of claim 2, wherein the compound of (b) has at least two methylene linkages having at least two electron withdrawing substituents attached to each of said methylene linkages.

4. The adhesive system of claim 2, wherein the iminium salt of structure II and the compound containing at least one methylene linkage having at least one electron withdrawing substituent attached thereto react under exposure to elevated temperature conditions.

5. The adhesive system of claim 2, wherein the compound of (b) has at least two methylene linkages having at least two electron withdrawing substituents attached to each of said methylene linkages, at least one of said electron withdrawing substituents attached to each of said methylene linkages being a carboxyl.

6. The adhesive system of claim 2, wherein the reactive functional group on compound of (c) is a member selected from the group consisting of epoxides, episulfides, oxetanes, isocyanates, (meth)acrylates, maleimides, benzoxazines, oxazolines, and combinations thereof.

7. A process for the preparation of a reactive adhesive system, steps of which comprise:
(a) providing in one part an imine within structure I wherein K is wherein $R_1$-$R_2$ are each independently selected from the group consisting of hydrogen, alkenyl, and alkynyl; and A-B are each independently selected from the group consisting of linear, branched, or cyclic alkyl or alkenyl which may be interrupted with heteroatoms or substituted by functional groups, or A and B taken together form a cyclic or polycyclic alkyl or alkenyl structure, which may be interrupted with heteroatoms or substituted by functional groups;

E is selected from the group consisting of a linear, branched and cyclic hydrocarbon with or without one or more nitrogen-containing substituents thereon, a heterocyclic, an aromatic or an organosiloxane group or part thereof or linkage; and $R_3$ is selected from the group consisting of a hydrocarbon, a heterocyclic, an aromatic and an organosiloxane group or linkage;

w is 1-100; y is 1-100 and z is 0-100, wherein when more than one of K, E or $R_3$ are present, each instance thereof is defined independently from the other instance(s);

(b) providing in a second part a compound containing at least one methylene linkage having at least one electron withdrawing substituent attached thereto, wherein the electron withdrawing substituent is selected from the group consisting of nitrile, carboxylic acids, carboxylic esters, sulphonic acids, ketones and nitro;

(c) mixing together the first part and the second part for a time sufficient to form a reactive electron deficient olefin; and (d) providing a compound bearing a functional group reactive with the electron deficient olefin product formed from mixing the first part with the second part.

8. The adhesive system of claim 2, wherein $R_3$ in structure II is attached to a solid support.

9. The adhesive system of claim 8, wherein the solid support is selected from the group consisting of silica, aluminum oxide, zeolites, and glass.

10. A process for the preparation of a reactive adhesive system, steps of which comprise:
(a) providing in a first part an iminium salt within structure II wherein K⁺ is wherein $R_1$-$R_2$ are each independently selected from the group consisting of hydrogen, alkenyl, and alkynyl; and A-B are each independently selected from the group consisting of linear, branched, or cyclic alkyl or alkenyl which may be interrupted with heteroatoms or substituted by functional groups, or A and B taken together form a cyclic or polycyclic alkyl or alkenyl structure, which may be interrupted with heteroatoms or substituted by functional groups;

E is selected from the group consisting of a linear, branched or cyclic hydrocarbon with or without one or more nitrogen-containing substituents thereon, a heterocyclic, an aromatic and an organosiloxane group or part thereof or linkage; and $R_3$ is selected from the group consisting of a hydrocarbon, a heterocyclic, an aromatic or an organosiloxane group or linkage; wherein when more than one of K, E or $R_3$ are present, each instance thereof is defined independently from the other instance(s);

w is 1-100; y is 1-100 and z is 0-100; and

X is an anion;

(b) providing in a second part a compound containing at least one methylene linkage having at least one electron withdrawing substituent attached thereto, wherein the electron withdrawing substituent is selected from the group consisting of nitrile, carboxylic acids, carboxylic esters, sulphonic acids, ketones and nitro;

(c) mixing together the first part and the second part for a time sufficient to form a product; and (d) providing a compound bearing a functional group reactive with the product formed from mixing the first part with the second part.

11. The adhesive system of claim 2, wherein the compound (b) containing at least one saturated methylene linkage having at least one electron withdrawing substituent attached thereto is selected from one or more of methyl, ethyl, n-propyl, i-propyl, propargyl, n-butyl, i-butyl, n-pentyl, n-hexyl, 2-ethylhexyl, n-octyl, n-nonyl, oxononyl, n-decyl, n-dodecyl, allyl, ethynyl, 2-butenyl, cyclohexyl, phenyl, phenethyl, tetrahydrofurfuryl, chloroethyl, 2,2,2-trifluoroethyl, hexafluoroisopropyl, methoxymethyl, methoxyethyl, methoxybutyl, ethoxyethyl, propoxyethyl, butoxymethyl, butoxyethyl or dimethyl siloxane esters of 2-cyanoacrylic acid.

12. The process of claim 7, wherein the compound (b) containing at least one saturated methylene linkage having at least one electron withdrawing substituent attached thereto is selected from one or more of methyl, ethyl, n-propyl, i-propyl, propargyl, n-butyl, i-butyl, n-pentyl, n-hexyl, 2-ethylhexyl, n-octyl, n-nonyl, oxononyl, n-decyl, n-dodecyl, allyl, ethynyl, 2-butenyl, cyclohexyl, phenyl, phenethyl, tetrahydrofurfuryl, chloroethyl, 2,2,2-trifluoroethyl, hexafluoroisopropyl, methoxymethyl, methoxyethyl, methoxybutyl, ethoxyethyl, propoxyethyl, butoxymethyl, butoxyethyl or dimethyl siloxane esters of 2-cyanoacrylic acid.

13. The adhesive system of claim 2, wherein the compound (b) has at least two methylene linkages having at least two electron withdrawing substituents attached to each of said methylene linkages.

14. The adhesive system of claim 2, wherein the compound (b) has at least two methylene linkages having at least two electron withdrawing substituents attached to each of said methylene linkages, at least one of said electron withdrawing substituents attached to each of said methylene linkages being a carboxyl.

15. The adhesive system of claim 14, wherein the carboxyl attached to each of said methylene linkages forms an ester with a linker between the so-formed esters.

16. The adhesive system of claim 15, wherein the linker is a member selected from the group consisting of linear, branched or cyclic alkylene, alkenylene or alkynylene, with or without interruption by heteroatoms or substitution by halogen, hydroxyl, ether, thioether, ester, reverse ester, or carboxylic acid; arylene; heteroaromatic; and siloxane.

* * * * *

UNITED STATES PATENT AND TRADEMARK OFFICE
CERTIFICATE OF CORRECTION

PATENT NO. : 8,686,105 B2
APPLICATION NO. : 11/877712
DATED : April 1, 2014
INVENTOR(S) : Ciaran B. McArdle and Ligang Zhao Page 1 of 1

It is certified that error appears in the above-identified patent and that said Letters Patent is hereby corrected as shown below:

In the specification

Column 4, line 48: After "with", insert -- the --.
Column 8, line 7: Change "where K- is" to -- where K+ is --.
Column 9, line 62: Change "$R_1$-$R_{12}$" to -- $R_1$-$R_2$ --.
Column 11, line 45: After "$EWG_1$", insert -- is --.
Column 12, lines 2 and 3: Change "molecular," to -- molecular. --.
Column 13, line 46: After "of", insert -- the --.
Column 14, Fig. C3: Change "5" to -- S --.
Column 14, line 40: Change "q" to -- g --.
Column 14, line 40: After "4,", insert -- 3, --.
Column 17, line 66: After "instant", delete ",".

Signed and Sealed this
Ninth Day of August, 2016

Michelle K. Lee
*Director of the United States Patent and Trademark Office*